(12) United States Patent
Iizuka et al.

(10) Patent No.: US 8,133,947 B2
(45) Date of Patent: Mar. 13, 2012

(54) GOLF BALL MATERIAL AND METHOD OF PREPARING THE SAME

(75) Inventors: Kae Iizuka, Chichibu (JP); Eiji Takehana, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

(21) Appl. No.: 12/706,175

(22) Filed: Feb. 16, 2010

(65) Prior Publication Data

US 2010/0160520 A1    Jun. 24, 2010

Related U.S. Application Data

(63) Continuation-in-part of application No. 12/340,790, filed on Dec. 22, 2008.

(51) Int. Cl.
| | |
|---|---|
| *C08L 33/02* | (2006.01) |
| *C08K 5/09* | (2006.01) |
| *A63B 37/12* | (2006.01) |
| *A63B 37/00* | (2006.01) |

(52) U.S. Cl. ........ 524/322; 524/394; 524/399; 524/400; 525/195; 525/196; 525/201; 525/221; 473/378; 473/385

(58) Field of Classification Search .......... None
See application file for complete search history.

(56) References Cited

U.S. PATENT DOCUMENTS

| | | | | |
|---|---|---|---|---|
| 5,306,760 A | * | 4/1994 | Sullivan | ........................ 473/385 |
| 5,312,857 A | | 5/1994 | Sullivan | |
| 5,567,772 A | * | 10/1996 | Hagman et al. | ................ 525/221 |
| 5,837,775 A | * | 11/1998 | Snell et al. | .................... 525/221 |
| 6,562,906 B2 | * | 5/2003 | Chen | .............................. 525/191 |
| 2002/0065149 A1 | * | 5/2002 | Tzivanis et al. | ................ 473/371 |
| 2008/0318710 A1 | | 12/2008 | Egashira et al. | |
| 2010/0160515 A1 | * | 6/2010 | Iizuka et al. | ................... 524/322 |
| 2010/0160517 A1 | * | 6/2010 | Iizuka et al. | ................... 524/394 |
| 2010/0160519 A1 | * | 6/2010 | Iizuka et al. | ................... 524/399 |
| 2011/0092314 A1 | * | 4/2011 | Higuchi et al. | ................ 473/373 |

FOREIGN PATENT DOCUMENTS

JP    2000-93557 A    4/2000

OTHER PUBLICATIONS

U.S. Appl. No. 12/340,793, filed Dec. 22, 2008, to Iizuka et al., entitled "Golf Ball Material and Method of Preparing the Same".

* cited by examiner

*Primary Examiner* — David Buttner

(74) *Attorney, Agent, or Firm* — Sughrue Mion, PLLC

(57) ABSTRACT

The invention provides a golf ball material made of a resin composition composed of (a-I) an olefin-acrylic acid copolymer having a weight-average molecular weight (Mw) of from about 150,000 to about 200,000 and a weight-average molecular weight (Mw) to number-average molecular weight (Mn) ratio of from about 3.0 to about 7.0, or a metal neutralization production thereof; (a-II) an olefin-methacrylic acid-unsaturated carboxylic acid ester copolymer having a weight-average molecular weight (Mw) of from about 120,000 to about 200,000 and a weight-average molecular weight (Mw) to number-average molecular weight (Mn) ratio of from about 3.0 to about 7.0, or a metal neutralization production thereof; (b) an organic acid or a metal salt thereof; and (c) a basic inorganic metal compound which is capable of neutralizing acid groups in the composition. The golf ball material of the invention enables a highly neutralized ionomer having good flow properties and moldability to be achieved. Golf balls in which an injection molding of the golf ball material is used as the cover material have an excellent rebound while retaining a good durability.

6 Claims, No Drawings

GOLF BALL MATERIAL AND METHOD OF PREPARING THE SAME

CROSS REFERENCE TO RELATED APPLICATION

This application is a continuation-in-part of copending application Ser. No. 12/340,790 filed on Dec. 22, 2008, the entire contents of which are hereby incorporated by reference.

BACKGROUND OF THE INVENTION

The present invention relates to a golf ball material which has good flow properties and moldability, and can be used to obtain high-performance golf balls endowed with excellent properties such as rebound resilience, durability, flexibility and scuff resistance. The invention also relates to a method of preparing such a golf ball material.

In recent years, ionomeric resins have been widely used in golf ball materials. Ionomeric resins are ionic copolymers of an olefin such as ethylene with an unsaturated carboxylic acid such as acrylic acid, methacrylic acid or maleic acid, in which some of the acidic groups are neutralized with metal ions such as sodium, lithium, zinc or magnesium. These resins have excellent characteristics in terms of the durability, rebound resilience and scuff resistance of the ball.

At present, the base resins used in golf ball cover materials are generally ionomeric resins, but various modifications are being made to address the constant desire by players for golf balls having a high rebound and an excellent flight performance. Recently, a number of approaches are being carried out to achieve a higher ball rebound in particular: blending together different ionomers, blending an ionomer with another thermoset resin and additives, and increasing the degree of neutralization of the ionomer itself.

One example of an improved ionomeric resin composition is the ionomeric resin composition disclosed in U.S. Pat. No. 5,312,857 which is obtained by blending from 25 to 75 parts by weight of a stearic acid metal salt with 100 parts by weight of ionomer.

In addition, JP-A 2000-93557 discloses art that increases ball rebound through the use of a material obtained by mixing a stearic acid metal salt with an ionomer that is a metal salt of a terpolymer.

However, in the foregoing ionomeric resin compositions, the ionomer serving as the base resin has a poor compatibility with various additives such as the stearic acid metal salt and the degree of increase in ionomer neutralization is excessive, resulting in a ball durability that is less than adequate.

SUMMARY OF THE INVENTION

It is therefore an object of the present invention to provide a golf ball material which has good flow properties and moldability, and which, when injection-molded and used as a golf ball component, helps confer the ball with an excellent rebound while enabling the ball to retain a good durability. Another object of the invention is to provide a method for preparing such a golf ball material.

As a result of extensive investigations, the inventors have discovered that when (a-I) an olefin-acrylic acid copolymer or a metal neutralization product thereof and (a-II) an olefin-methacrylic acid-unsaturated carboxylic acid ester copolymer or a metal neutralization product thereof are used in combination (a-I) (a-II) as an ionomer or a base resin thereof, the ionomeric resin compositions obtained by selecting such polymers with a weight-average molecular weight and a weight-average molecular weight/number-average molecular weight within specific ranges, adding thereto an organic acid or a metal salt thereof, and further adding a metal ionic species so as to carry out an acid neutralization reaction, have good flow properties and moldability. In addition, the inventors have found that, surprisingly, golf balls in which an injection molding made of such a composition has been used as, for example, the cover material have an excellent rebound while retaining a good durability. These discoveries ultimately led to the present invention.

Accordingly, the present invention provides the following golf ball material and method of preparing the same.

[1] A golf ball material comprising a resin composition comprised of:

(a-I) an olefin-acrylic acid copolymer having a weight-average molecular weight (Mw) of from about 150,000 to about 200,000 and a weight-average molecular weight (Mw) to number-average molecular weight (Mn) ratio of from about 3.0 to about 7.0, or a metal neutralization production thereof;

(a-II) an olefin-methacrylic acid-unsaturated carboxylic acid ester copolymer having a weight-average molecular weight (Mw) of from about 120,000 to about 200,000 and a weight-average molecular weight (Mw) to number-average molecular weight (Mn) ratio of from about 3.0 to about 7.0, or a metal neutralization production thereof;

(b) an organic acid or a metal salt thereof; and (c) a basic inorganic metal compound, wherein component (b) is included in an amount of from about 85 to about 130 parts by weight per 100 parts by weight of (a-I) and (a-II) combined, and all or some acid groups in the composition are neutralized by metal ions in component (c).

[2] The golf ball material of [1] which has a melt flow rate at 190° C. and 2.16 kgf of from about 3.0 to about 10.0 g/10 min.

[3] The golf ball material of [1], wherein component (a-I) and component (a-II) each have an acid content of at most about 15 wt %.

[4] The golf ball material of [1], wherein component (a-I) and component (a-II) have a mixing ratio therebetween of from 5:95 to 95:5 by weight.

[5] The golf ball material of [1] which is adapted for use as a cover material or an intermediate layer material in a two-piece solid golf ball composed of a core and a cover encasing the core or in a multi-piece solid golf ball composed of a core of at least one layer, one or more intermediate layer encasing the core, and a cover of at least one layer encasing the intermediate layer.

[6] A method of preparing a golf ball material, the method comprising the step of preparing the golf ball material of [1] using a single-screw extruder, a twin-screw extruder or a tandem extruder thereof.

DETAILED DESCRIPTION OF THE INVENTION

The invention is described more fully below.

The golf ball material of the present invention contains a resin composition composed of (a-I) an olefin-acrylic acid copolymer or a metal neutralization product thereof, (a-II) an olefin-methacrylic acid-unsaturated carboxylic acid ester copolymer or a metal neutralization product thereof, (b) an organic acid or a metal salt thereof, and (c) a basic inorganic metal compound.

The proportion of the resin composition composed of above components (a-I), (a-II), (b) and (c), based on the total amount of the golf ball material, is at least about 50 wt %, preferably at least about 60 wt %, more preferably at least about 70 wt %, and most preferably at least about 90 wt %.

The components (a-I), (a-II), (b) and (c) are each described below.

Both (a-I) and (a-II) are used together in the present invention. These are the chief polymers in the golf ball material of the invention. When blended with the other components (b) and (c), it is thought that these polymers undergo a large change in character, resulting in improvements in the physical properties of the golf ball material and, in particular, in the rebound and durability of injection moldings thereof.

In the above polymer (a-I), the weight-average molecular weight (Mw) is set in a range of from about 150,000 to about 200,000, and the weight-average molecular weight (Mw) to number-average molecular weight (Mn) ratio (Mw/Mn) is set in a range of from about 3.0 to about 7.0. If the Mw is too high, the polymer tends to become elastic and is difficult to pelletize. On the other hand, if the Mw is too low, although it is possible to mold the material, the molding obtained ends up being brittle. The weight-average molecular weight (Mw) is preferably in a range of from about 170,000 to about 190,000. The Mw/Mn ratio is preferably from about 4.5 to about 6.5. When this value is lower than the above range, the molecular structure approaches a single structure, which may lead to brittleness in moldings of the golf ball material. Conversely, at a high Mw/Mn value, the significance of the polymer as an ionomer diminishes, as a result of which the objects of the invention may not be attained.

In the above polymer (a-II), the weight-average molecular weight (Mw) is set in a range of from about 120,000 to about 200,000, and the weight-average molecular weight (Mw) to number-average molecular weight (Mn) ratio (Mw/Mn) is set in a range of from about 3.0 to about 7.0. If the Mw is too high, the polymer tends to become elastic and is difficult to pelletize. On the other hand, if the Mw is too low, although it is possible to mold the material, the molding obtained ends up being brittle. The weight-average molecular weight (Mw) is preferably in a range of from about 120,000 to about 180,000. The Mw/Mn ratio is preferably from about 4.0 to about 6.5. When this value is lower than the above range, the molecular structure approaches a single structure, which may lead to brittleness in moldings of the golf ball material. Conversely, at a high Mw/Mn value, the significance of the polymer as an ionomer diminishes, as a result of which the objects of the invention may not be attained.

Here, the weight-average molecular weight (Mw) and number-average molecular weight (Mn) are values calculated relative to polystyrene in gel permeation chromatography (GPC). A word of explanation is needed here concerning GPC molecular weight measurement. It is not possible to directly take GPC measurements for binary copolymers and ternary copolymers because these molecules are adsorbed to the GPC column based on the unsaturated carboxylic acid groups within the molecule. Instead, the unsaturated carboxylic acid groups are generally converted to esters, following which GPC measurement is carried out and the polystyrene-equivalent average molecular weights Mw and Mn are calculated.

The olefin used in above component (a-I) or (a-II), while not subject to any particular limitation, preferably has from 2 to 6 carbons, and is most preferably ethylene. The unsaturated carboxylic acids used in component (a-I) and (a-II) are limited to, respectively, acrylic acid (AA) and methacrylic acid (MAA). Thus, in the present invention, a binary copolymer or binary ionomer containing acrylic acid and a ternary copolymer or ternary ionomer containing methacrylic acid are used together. Ball moldings obtained by injection-molding this resin composition have a good durability and rebound. The unsaturated carboxylic acid ester used in component (a-II), while not subject to any particular limitation, is preferably a lower alkyl ester, and most preferably butyl acrylate (n-butyl acrylate, i-butyl acrylate).

The unsaturated carboxylic acid contents (acid contents) in components (a-I) and (a-II), while not subject to any particular limitation, are each preferably at least about 8 wt % but not more than about 15 wt %. If the acid content is too low, moldings of the golf ball material may not be able to achieve a good rebound. On the other hand, if the acid content is too high, such moldings may become excessively hard, adversely affecting the durability.

As noted above, an olefin-acrylic acid copolymer (binary copolymer) or a metal salt thereof and an olefin-methacrylic acid-unsaturated carboxylic acid ester copolymer (ternary copolymer) or a metal salt thereof are used together as components (a-I) and (a-II) in the present invention. The mixing ratio therebetween is not subject to any particular limitation. However, to more fully manifest the desirable effects of the invention, it is advantageous for the weight ratio (a-I):(a-II) to be from 5:95 to 95:5, preferably from 20:80 to 90:10, and more preferably from 30:70 to 90:10. Including component (a-I) in an amount greater than the above range makes the material difficult to mold, which may result in a poor ball durability. Including component (a-II) in an amount greater than the above range makes it more difficult to achieve a high ball rebound.

In cases where a metal neutralization product is used in component (a-I) (a-II), i.e., in cases where an ionomer is used, the type of metal neutralization product and the degree of neutralization are not subject to any particular limitation. Specific examples include 60 mol % zinc (degree of neutralization with zinc) ethylene-acrylic acid copolymers, 40 mol % magnesium (degree of neutralization with magnesium) ethylene-acrylic acid copolymers, 40 mol % magnesium (degree of neutralization with magnesium) ethylene-methacrylic acid-isobutylene acrylate terpolymers, and 60 mol % Zn (degree of neutralization with zinc) ethylene-methacrylic acid-isobutylene acrylate terpolymers.

As mentioned above, copolymers or ionomers having a weight-average molecular weight (Mw) and a molecular weight distribution breadth (U=Mw/Mn) set within specific ranges are used as components (a-I) and (a-II). For example, use may be made of commercial products such as those available under the trade names Escor 5100 and Escor 5200 (produced by ExxonMobil Chemical) as component (a-I). Similarly, use may be made of a commercial product such as that available under the trade name, Nucrel N035C (produced by DuPont-Mitsui Polychemicals Co., Ltd.) as component (a-II).

The organic acid or metal salt thereof serving as component (b), while not subject to any particular limitation, is preferably one or more selected from the group consisting of stearic acid, behenic acid, oleic acid, maleic acid and metal salts thereof. The organic acid metal salt of component (b) is preferably a metallic soap and makes use of a metal ion having a valence of from 1 to 3 and preferably selected from the group consisting of lithium, sodium, magnesium, aluminum, potassium, calcium and zinc. A metal salt of stearic acid is especially preferred. Specifically, the use of magnesium stearate, calcium stearate, zinc stearate or sodium stearate is preferred. Of these, the use of magnesium stearate is especially preferred.

Component (b) is included in an amount, per 100 parts by weight of above components (a-I) and (a-II) combined, in a range of from about 85 to about 130 parts by weight, with the lower limit being preferably at least about 90 parts by weight, and more preferably at least about 100 parts by weight, and the upper limit being preferably not more than about 125 parts by weight, and more preferably not more than about 120 parts by weight. In the present invention, a relatively large amount of an organic acid or a metal salt thereof is included with respect to the mixed resin of the acrylic acid-containing binary copolymer or binary ionomer of component (a-I) and the methacrylic acid-containing ternary copolymer or ternary ionomer of component (a-II) for the purpose of increasing the rebound of the golf ball while maintaining its durability. If component (b) is included in too small an amount, a high ball rebound will be difficult to achieve. On the other hand, if component (b) is included in too large an amount, the flow properties of the resin material will rise markedly, making it impossible to obtain a resin mixture having a pellet shape optimal for molding.

Illustrative examples of the metal ions in the basic inorganic metal compound of above component (c) include $Na^+$, $K^+$, $Li^+$, $Zn^{2+}$, $Ca^{2+}$, $Cu^{2+}$ and $Co^{2+}$. Of these, $Na^+$, $Zn^{2+}$, $Ca^{2+}$ and $Mg^{2+}$ are preferred, and $Mg^{2+}$ is especially preferred. These metal salts may be introduced into the resin using, for example, formates, acetates, nitrates, carbonates, bicarbonates, oxides or hydroxides.

The basic inorganic metal compound of (c) above is used for the purpose of neutralizing all or some of the acid groups in the composition with the metal ions thereof. The amount in which the basic inorganic metal compound (c) is added may be suitably selected so as to obtain the desired degree of neutralization. Specifically, the amount of component (c) included is selected as appropriate for neutralizing at least 60 mol %, preferably at least 65 mol %, and more preferably at least 70 mol %, but not more than 100 mol %, preferably not more than 95 mol %, and more preferably not more than 90 mol %, of the acid groups in above components (a-I), (a-II) and (b).

The following thermoplastic resins may be included in the golf ball material of the invention, insofar as the objects of the invention are attainable. Illustrative, non-limiting, examples of thermoplastic resins that may be used include polyolefin elastomers (including polyolefins and metallocene polyolefins), polystyrene elastomers, diene polymers, polyacrylate polymers, polyamide elastomers, polyurethane elastomers, polyester elastomers and polyacetals.

In addition, the golf ball material of the invention may also include optional additives as appropriate for the intended use. For example, when the inventive golf ball material is to be used as a cover material, various additives such as pigments, dispersants, antioxidants, ultraviolet absorbers and light stabilizers may be added to the above resin composition. When such additives are included, they may be added in an amount of generally at least 0.1 part by weight, and preferably at least 0.5 part by weight, but generally not more than 10 parts by weight, and preferably not more than 4 parts by weight, per 100 parts by weight of the above resin composition.

The melt flow rate (MFR) of the inventive golf ball material, as measured in accordance with JIS-K7210 at a test temperature of 190° C. and a test load of 21.18 N (2.16 kgf), is not subject to any particular limitation. However, to provide good flow properties and moldability at the time of injection molding, it is recommended that the melt flow rate be preferably at least about 1.0 g/10 min, more preferably at least about 2.0 g/10 min, and even more preferably at least about 3.0 g/10 min, but preferably not more than about 10.0 g/10 min, and more preferably not more than about 6.0 g/10 min.

The method of preparing the golf ball material of the present invention is not subject to any particular limitation, although use may be made of a method which involves charging the ionomers or un-neutralized polymers of components (a-I) and (a-II), together with component (b) and component (c), into a hopper and extruding under the desired conditions. Alternatively, component (b) may be charged from a separate feeder. In this case, the neutralization reaction by above component (c) as the metal cation source with the carboxylic acids in components (a-I), (a-II) and (b) may be carried out by various types of extruders. The extruder may be either a single-screw extruder or a twin-screw extruder, although a twin-screw extruder is preferable. Alternatively, these extruders may be used in a tandem arrangement, such as single-screw extruder/twin-screw extruder or twin-screw/twin-screw extruder. These extruders need not be of a special design; the use of existing extruders will suffice.

The golf ball material of the invention may be used as the material for a one-piece golf ball, or may be used as a cover material or an intermediate layer material in a two-piece solid golf ball composed of a core and a cover encasing the core or in a multi-piece solid golf ball composed of a core of at least one layer, one or more intermediate layer encasing the core, and a cover of at least one layer encasing the intermediate layer.

As described above, the golf ball material of the present invention is obtained by adding a large and specific amount of an organic acid or a metal salt thereof and a specific amount of a basic inorganic metal compound capable of neutralization to an ionomer resin composition in which both a binary copolymer (or metal salt thereof) and a ternary copolymer (or a metal salt thereof) having weight-average molecular weights and molecular weight distribution breadths (weight-average molecular weight/number-average molecular weight) set within specific ranges are used. A highly neutralized ionomer having good flow properties and moldability can be achieved in this way. Golf balls in which an injection molding made from the inventive golf ball material is used as a cover material or the like have an excellent rebound while retaining a good durability.

EXAMPLES

The following Examples and Comparative Examples are provided by way of illustration and not by way of limitation.
Examples 1 and 2, Comparative Examples 1 to 3

Solid cores having a diameter of 37.50 mm and a weight of 32.80 g were obtained using a core material of the following formulation and composed primarily of cis-1,4-polybutadiene.

| Core Formulation | |
|---|---|
| cis-1,4-Polybutadiene | 100 parts by weight |
| Zinc oxide | 5.0 parts by weight |
| Barium sulfate | 26.0 parts by weight |
| Antioxidant | 0.1 part by weight |
| Zinc acrylate | 23.0 parts by weight |
| Crosslinking agent (organic peroxide) | 1.2 parts by weight |

Next, in each example, an intermediate layer material having the composition shown in Table 1 was mixed in a kneading-type twin-screw extruder at 200° C. to give a cover material in the form of pellets. The material was then extruded within a mold in which the above solid core had been placed, thereby producing a sphere having an intermediate layer of 1.5 mm thickness.

A cover composition of Himilan (trademark) 1605 and Himilan 1706 blended in a 50:50 weight ratio was then injection-molded as the outermost layer (cover) material over the sphere, thereby producing a three-piece solid golf ball of the diameter and weight shown in Table 1.

The properties of the resulting golf balls in the respective examples and comparative examples were evaluated as described below. The results are presented in Table 1.

TABLE 1

| Resin material of intermediate layer | Example | | Comparative Example | | |
|---|---|---|---|---|---|
|  | 1 | 2 | 1 | 2 | 3 |
| AA-type ionomer | 90 | 90 | 90 | 10 |  |
| MAA-type ionomer | 10 | 10 | 10 |  |  |
| Himilan 1557 |  |  |  | 90 |  |
| HPF1000 |  |  |  |  | 100 |
| Magnesium stearate | 100 | 120 | 70 | 100 |  |
| Mg(OH)$_2$ | 1.8 | 1.6 | 2.3 | 1.8 | — |
| Degree of neutralization (%) | 75 | 75 | 80 | 75 | 100 |
| MFR (g/10 min) | 3.8 | 4.1 | 1.8 | 3.8 | 1.0 |
| Ball properties Diameter, mm | 42.76 | 42.75 | 42.76 | 42.77 | 42.70 |
| Weight, g | 44.65 | 44.68 | 44.55 | 44.59 | 45.71 |
| Deflection (10-130 kgf), mm | 2.31 | 2.27 | 2.43 | 2.19 | 3.07 |
| Initial velocity, m/s | 78.45 | 78.49 | 78.33 | 77.88 | 77.23 |
| Durability | good | good | fair | NG | NG |

Ingredient amounts shown above are in parts by weight.

The materials in the above table are explained below.

AA-Type Ionomer (Binary Ionomer)

An ethylene-acrylic acid binary copolymer produced by ExxonMobil Chemical. Mw, 188,000; Mw/Mn, 6.37.

MAA-Type Ionomer (Ternary Ionomer)

An ethylene-methacrylic acid-isobutylene acrylate terpolymer produced by DuPont-Mitsui Polychemicals Co., Ltd. Mw, 127,000; Mw/Mn, 4.37, acid content 10 wt %.

Himilan 1557 (Trade Name)

A zinc ion neutralization product (ionomer resin) of an ethylene-methacrylic acid copolymer, produced by DuPont-Mitsui Polychemicals Co., Ltd. Mw, 94,600; Mw/Mn, 4.19.

HPF1000 (Trade Name)

A terpolymer composed of about 75 to 76 wt % ethylene, about 8.5 wt % acrylic acid and about 15.5 to 16.5 wt % n-butyl acrylate. All (100%) of the acid groups are neutralized with magnesium ions. Produced by DuPont. Mw, 105,000; Mw/Mn, 3.72.

The molecular weights and molecular weight distributions of each of the above polymers were determined by measurement using gel permeation chromatography (GPC), followed by calculation of the polystyrene-equivalent values.

Magnesium Stearate

Available under the trade name Magnesium Stearate G from NOF Corporation.

The physical properties of the golf ball material and the golf ball were measured as follows.

MFR (g/10 min)

The value was measured in general accordance with JIS-K7210 at a test temperature of 190° C. and a test load of 21.18 N (2.16 kgf).

Deflection (mm)

The golf ball was placed on a steel plate, and the deflection (mm) by the ball when compressed under a final load of 1,275 N (130 kgf) from an initial load of 98 N (10 kgf) was measured. This test was carried out at 23±1° C.

Initial Velocity (m/s)

The initial velocity of the ball was measured using an initial velocity measuring apparatus of the same type as the USGA drum rotation-type initial velocity instrument approved by the R&A. The ball was held isothermally at a temperature of 23±1° C. for at least 3 hours, then tested at the same temperature. The ball was hit using a 250-pound (113.4 kg) head (striking mass) at an impact velocity of 143.8 ft/s (43.83 m/s). Ten balls were each hit twice. The time taken by the ball to traverse a distance of 6.28 ft (1.91 m) was measured and used to compute the initial velocity of the ball. This cycle was carried out over a period of about 15 minutes.

Durability on Repeated Impact

The durability of the golf ball was evaluated using an ADC Ball COR Durability Tester produced by Automated Design Corporation (U.S.). A ball was fired using air pressure and made to repeatedly strike two metal plates arranged in parallel. Using the average number of shots required for the ball to crack, the durability was rated according to the criteria indicated below. (Average values were obtained by furnishing four balls of the same type for testing, repeatedly firing each of the four balls until it cracked, and averaging the number of shots required for the respective balls to crack. The type of tester used was a vertical COR durability tester, and the incident velocity of the balls on the metal plates was 43 m/s.)

Good: More than 150 shots
Fair: 100 to 150 shots
NG: Less than 100 shots

As is apparent from the results in Table 1 above, the golf balls obtained in Comparative Examples 1 to 3 had the following drawbacks.

In Comparative Example 1, the amount of magnesium stearate included was lower than the range in the present invention. As a result, compared with Examples 1 and 2 according to the invention, the ball had a good durability but a lower rebound.

In Comparative Example 2, the AA-type ionomer was the same, but a MAA-type ionomer having a low molecular weight was used. As a result, compared with Examples 1 and 2 according to the invention, the ball had a lower initial velocity and durability.

In Comparative Example 3, only a commercial ionomer having a relatively low molecular weight was used. As a result, compared with Examples 1 and 2 according to the invention, the ball had a lower initial velocity and durability.

Then invention claimed is:

1. A golf ball material comprising a resin composition comprised of:

(a-I) an olefin-acrylic acid copolymer having a weight-average molecular weight (Mw) of from about 150,000 to about 200,000 and a weight-average molecular weight (Mw) to number-average molecular weight (Mn) ratio of from about 3.0 to about 7.0, or a metal neutralization production thereof;

(a-II) an olefin-methacrylic acid-unsaturated carboxylic acid ester copolymer having a weight-average molecular weight (Mw) of from about 120,000 to about 200,000 and a weight-average molecular weight (Mw) to number-average molecular weight (Mn) ratio of from about 3.0 to about 7.0, or a metal neutralization production thereof;

(b) an organic acid or a metal salt thereof; and (c) a basic inorganic metal compound, wherein component (a-I) and component (a-II) have a mixing ratio therebetween of from 90:10 to 95:5 by weight, and component (b) is included in an amount of from about 100 to about 130 parts by weight per 100 parts by weight of (a-I) and (a-II) combined, and all or some acid groups in the composition are neutralized by metal ions in component (c).

2. The golf ball material of claim 1 which has a melt flow rate at 190° C. and 2.16 kgf of from about 3.0 to about 10.0 g/10 min.

3. The golf ball material of claim 1, wherein component (a-I) and component (a-II) each have an acid content of at most about 15 wt %.

4. The golf ball material of claim 1 which is adapted for use as a cover material in a two-piece solid golf ball composed of a core and a cover encasing the core.

5. A method of preparing a golf ball material, the method comprising the step of preparing the golf ball material of claim 1 using a single-screw extruder, a twin-screw extruder or a tandem extruder thereof.

6. The golf ball material of claim 1 which is adapted for use as an intermediate layer material in a multi-piece solid golf ball composed of a core of at least one layer, one or more intermediate layer encasing the core, and a cover of at least one layer encasing the intermediate layer.

* * * * *